April 28, 1953 — H. B. VAN DORN — 2,636,380
AIR GAUGE
Filed Dec. 20, 1947 — 2 SHEETS—SHEET 1
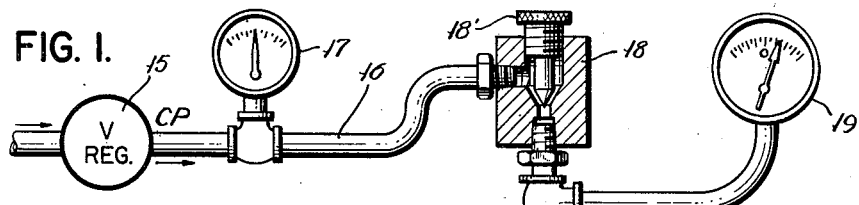
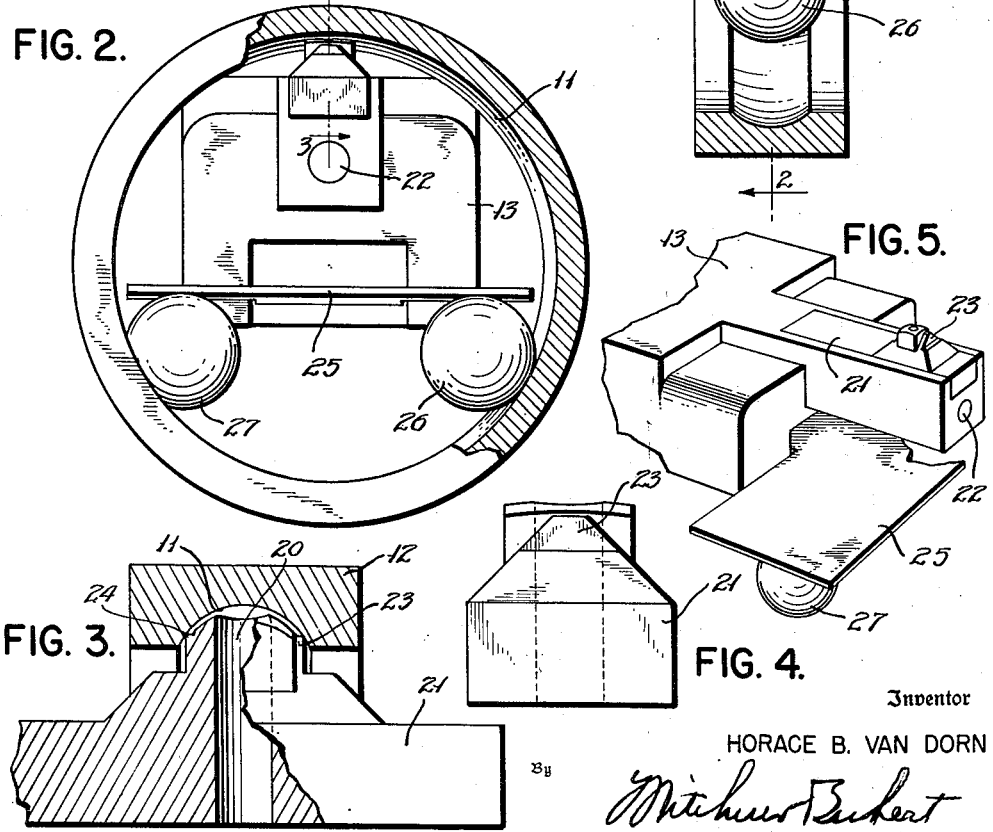
Inventor
HORACE B. VAN DORN April 28, 1953 H. B. VAN DORN 2,636,380
AIR GAUGE
Filed Dec. 20, 1947 2 SHEETS—SHEET 2
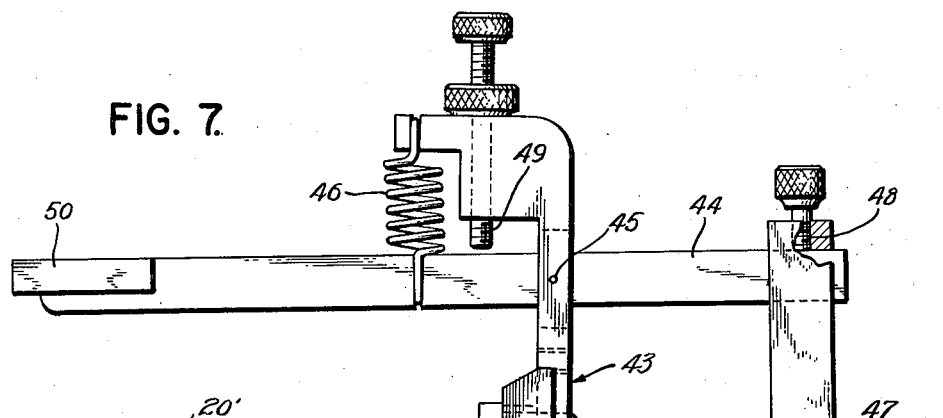
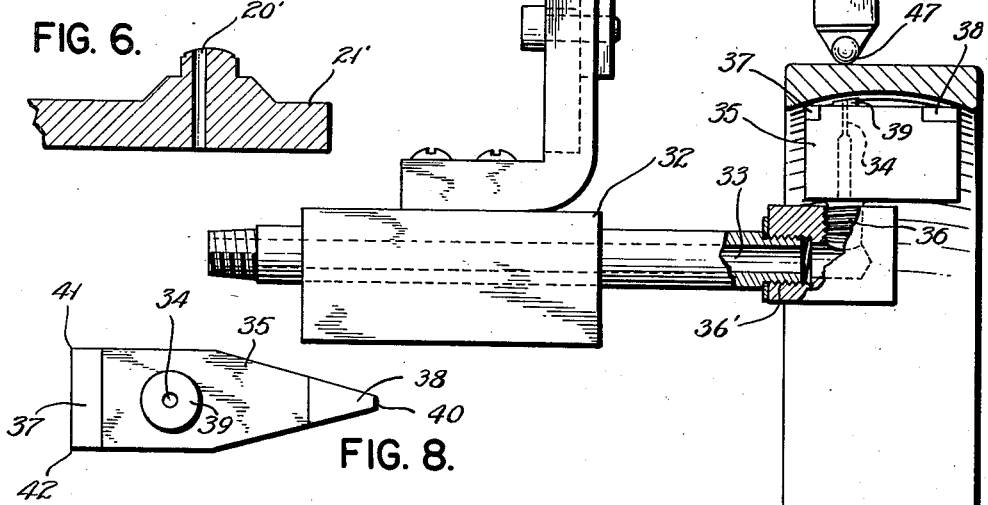
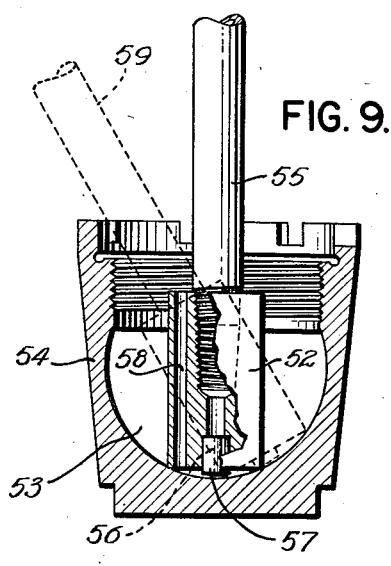
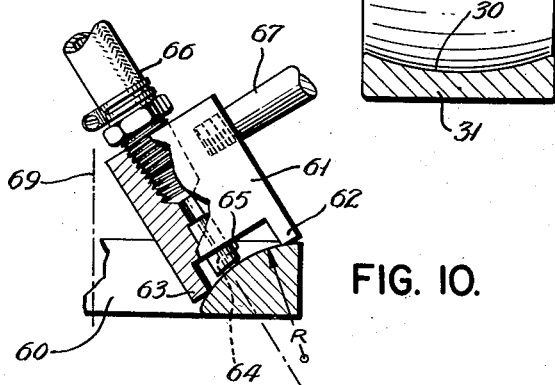
Inventor
HORACE B. VAN DORN
By Mitchum Bashert
Attorneys Patented Apr. 28, 1953

2,636,380

UNITED STATES PATENT OFFICE 2,636,380

AIR GAUGE

Horace Bishop Van Dorn, New Britain, Conn., assignor to The Fafnir Bearing Company, New Britain, Conn., a corporation of Connecticut Application December 20, 1947, Serial No. 793,023

10 Claims. (Cl. 73—37.5)

My invention relates to gaging means for measuring and checking spherical, toroidal, spheroidal, and the like concave or convex surfaces.

It is an object of the invention to provide an improved device of the character indicated.

It is another object to provide an improved apparatus for checking the form and contour of a surface of the character indicated.

It is also an object to provide a device for rapidly checking the radius of a generally spherical surface.

It is a more specific object to provide improved means for checking raceways in the rings of antifriction bearings and for checking the spherical or spheroidal seating grooves of the rings of self-aligning bearings.

It is a further object to provide an air-operated gage to meet the above objects.

It is, in general, an object to provide an improved gage of the character indicated for rapidly checking with a high degree of accuracy the radius of a generally spherical surface, and the form and contour of such a surface, and for performing these operations with a minimum of wear and with a minimum of exacting attention of the individual charged with operating the device.

Other objects and various further features of the invention will be pointed out or will occur to those skilled in the art from a reading of the following specification in conjunction with the accompanying drawings. In said drawings, which show, for illustrative purposes only, preferred forms of the invention:

Fig. 1 is a partly schematic and partly sectionalized view of a gaging device incorporating features of the invention, and shown in position to perform form checking of the race in the outer ring of a ball bearing;

Fig. 2 is an end view of the gaging element of Fig. 1, partly sectionalized in the plane 2—2 of Fig. 1;

Fig. 3 is an enlarged sectional view taken substantially in the plane 3—3 of Fig. 2;

Fig. 4 is an enlarged right-end view of the gage part shown in Fig. 3;

Fig. 5 is a fragmentary perspective view of the gaging assembly of Fig. 1;

Fig. 6 is an enlarged sectionalized view similar to Fig. 3 but illustrating a form modified for contour checking;

Fig. 7 is a partly sectionalized side view of another gaging device illustrating features of the invention;

Fig. 8 is an enlarged top view of the gaging element in the assembly of Fig. 7;

Fig. 9 is a partly sectionalized view of still another gaging device, for gaging concave surfaces; and Fig. 10 is partially sectionalized view of a gage embodying features of the invention, for checking convex surfaces of the character indicated.

Briefly stated, my invention contemplates the use of novel air-gage means for the probing of spherical, spheroidal, and other generally spherical surfaces in order to check radius, form, and contour, as the case may be. In all forms to be described, I employ a gaging member having an internal air passage with a gage opening on one side of the member, and with supporting means on generally opposite sides of the opening to engage the surface to be measured and to position the opening in close constricting relation with the surface to be measured. If a known flow of air or other pressure fluid is directed through said opening (as when placing a known sample opposite the opening) prior to placing the gage against the surface to be measured, then such latter placement may develop a different constriction at the opening so as to change the pressure on one side of the opening, say in the air or other supply passage in the gage member. The resulting pressure or flow will be understood to be a function of the departure in curvature of the surface being measured (at the point where the gage is applied) from the curvature of the known sample.

In one of the forms to be described, the gage member is designed to project into the raceway of an antifriction bearing ring, and resilient means carried with the member serve constantly to align the opening with the surface to be measured. The resilient means may include fingers or feet projecting into the raceway at points symmetrically spaced circumferentially from the gage point, in such a way as to permit manual turning of the bearing ring with respect to the gage while visually checking the pressure, as influenced by the constricting effect of the raceway surface being checked.

Referring to Figs. 1 through 6 of the drawings, my invention is shown in application to an air-gage system adapted to the form and contour checking of the race 11 in a ball-bearing ring 12, which is shown to be the outerbearing ring. The gage may include a base member 13 with an internal air-supply passage 14 connected to a suitable source of pressurized air. Such source may include a pressure regulator 15 to supply air at substantially constant pressure in a supply line 16, and the regulated pressure may be observed on an indicator, such as the Bourdon gage 17. For a purpose which will be clear, I provide a constricting orifice between the supply line 16 and the passage 14 in the gage block or base 13. This orifice may be fixed, but in the form shown it is adjustably variable and comprises a needle valve 18 having a knob 18' for manual adjustment. Another indicator, which may be a flow tube or a manometer or a Bourdon gage 19 (as shown), is placed between the orifice or needle valve 18 and the gage member 13.

The gage member 13 includes a gage opening 20 in communication with the passage 14, and, in the form shown, this opening 20 is provided in an insertable gage element 21, which may be tightly secured to the base member 13, as by sweating. The inserted member 21 is preferably of relatively hard material, such as tungsten carbide, and the opening 20 may be cast in the formation of element 21. Passage 14 may be drilled in base member 13, and the outer end is shown plugged at 22.

The surface of gage element 21 which faces the surface to be measured, and which is to be pierced by the gage opening 20, preferably conforms generally with the curvature of the surface to be measured. In the form shown, supporting means in the form of feet 23—24 project to intercept the surface 11 to be measured and so as, therefore, relatively closely to space the opening 20 with respect to surface 11. Since the feet 23—24 are preferably formed with the casting of element 21 as projecting edges, these edges which support the surface 11 to be measured may be honed, stoned, or otherwise abraded to assure the desired proper position of opening 20 with respect to the surface 11; thus formed, the feet 23—24 will be understood to constitute essentially point-support areas having minimum-area contact with the surface being gaged.

In the form shown, that is for a gage to check the form of race 11, the curvature of the gage surface facing the race 11 at the gaging point is preferably spheroidal, so as to provide a relatively close approach of the opening 20 to the surface of the race 11 and, at the same time, to provide ample areas for the exhaust of air. Thus, in a first plane including the axis of gage opening 20 and normal to the axis of the bearing ring, the curved surface facing raceway 11 may be generally concentric with the raceway; and in a second plane including the axis of the opening 20 and generally normal to the first plane, the radius of curvature of the surface facing the race 11 may be smaller than the race curvature. The exhaust passage thus defined will be appreciated as extending in opposite directions from the opening 20, circumferentially of the bearing ring 12.

In order to position the bearing ring 12 at all times accurately with respect to the opening 20, I provide resilient means, such as the spring 25, carried by the gage member 13 and including feet 26—27 to engage the raceway 11 at points symmetrically spaced circumferentially of the supporting feet 23—24. The spring means 25 is shown soldered to the base member 13, as at 28, and also to the feet 26—27, as at 29. The feet 26—27 may be balls of a size preferably slightly larger than intended normally to run in the raceway 11, and the centers of these balls 26—27 are preferably in a radial plane of the bearing to be tested.

In use, the described gaging device may very readily accommodate the outer bearing ring 12 by first setting the feet or balls 26—27 in the raceway 11 and by then pushing the ring 12 upwardly, so as to deflect spring 25. When the spring 25 is sufficiently deflected, the upper part of the ring 12 may be swung over and seated at the gage opening 20; the resilient means 25 will be understood to be effective to retain this seated relationship. Depending upon the curvature of the raceway 11, there will be more or less constriction of passage or opening 20, with the development of more or less pressure in the supply line, as indicated by the Bourdon gage 19. When the bearing ring 12 is manually rotated with respect to the gage 13, with the resilient means 25 constantly maintaining the described seating relation, any form deviations may be noted as pressure fluctuations on the dial of the gage 19. After completing a revolution, the ring 12 may be removed and another ring inserted for the same check.

It will be understood that the described operation may be performed in very short order and that, if desired, the hand knob 18' of the needle valve may be adjusted to produce a zero reading on gage 19 when a test surface 11 of known curvature is seated opposite the opening 20. In such case, the gage 19 may be direct reading in terms of magnitude of deviations in form from the known correct curvature, as will be clear.

In the preferred form shown, the supporting corners 23—24 are in substantially a common plane with the axis of opening 20, and this plane may also include the central axis of the bearing ring 11 under observation. With this arrangement, it will be appreciated that pitch-diameter variations existing in a normal plane (i. e. normal to the central axis of the bearing ring 11) may be of negligible moment and are relatively unlikely to affect the race-radius readings, which are observed on the indicator 19. It will further be appreciated that this construction may be applicable, without further adaptation, to the race-radius checking of a number of bearing-ring sizes, if these bearing rings utilize balls of the same size.

In order to make contour measurements on a race groove such as the raceway 11 of outer bearing ring 12, I may employ a gage element 21' similar to the element 21 which has been described. The gage element 21' differs, however, in that its gage opening 20' is offset from the central radial plane of the raceway 11. It will be clear that the bearing ring 12 may be rotated around the gage element 21', and the pressure readings on diameter 19 noted in the manner described for gage element 21. These pressure readings will be indicative of contour to one side of the central radial plane of the raceway 11. If the ring 12 is then removed and reversibly inserted upon the gage element 21', a second rotation of the ring 12 may provide a check of contour on the other side of the central radial plane of the raceway 11.

In Figs. 7 and 8, I show a modified form of the invention for particular application to checking a concave spherical radius, as may be formed in the seat 30 of the seat ring or outer race ring 31 of a self-aligning antifriction bearing. As in the case of the first described gages, the gage of Fig. 7 may employ a base or a block 32 having an internal air-supply passage 33 communicating with a gage opening 34 in a gage element 35, which is preferably detachably secured as by threaded means 36—36' to the base member 32. The gage element 35 may include supporting means 37—38 on generally opposite sides of the opening 34 for properly closely spacing the opening 34 with respect to the surface 30 to be gaged. In the form shown, the opening 34 is formed in a projecting part 39 of the gage element 35, and the outer projecting surface thereof is preferably in general conformity with the surface 30 to be gaged.

The gage element 35 may, like the gage element 21, be formed as a casting of relatively hard material; in the form shown, however, the supporting portions 37—38 are mere inserts of relatively hard material, set, as by sweating, into a gage element 35 of more readily machinable material. In Fig. 8 the top of gage element 35 will be seen preferably to be of generally triangular shape so as to provide, at the corners 40—41—42, hardened points of support for properly spacing the opening 34 with respect to the seat surface 30 to be gaged. Again, the corners 40—41—42 may be honed, stoned, or otherwise abraded, as need be. The span from corner 40 to the edge 41—42 is preferably substantially greater than the distance between corners 41—42, in order that variations in great-circle radius (i. e. variations in radius of the spherical surface 30 under observation) between corners 41—42 may not appreciably affect the measurements being taken on the radius of the great circles spanned by corner 40 and edge 41—42.

In order properly to hold the member or piece 31 having the surface 30 to be gaged, I employ in the form shown an adjustable bracket means 43 including an arm 44 pivoted at 45 and resiliently urged as by a spring 46 in a clockwise sense (in the sense of Fig. 7) to press the finger 47 against the seat ring 31. The finger 47 may be adjustably positioned as by means of the set screw 48 along the arm 44, depending upon the size of ring 31 to be tested and also upon the gage element 35 employed, and the adjustment is preferably such that the thrust of finger 47 is in general alignment with the discharge axis of opening 34. A screw 49 in the bracket 43 may serve to limit such clockwise rotation of the arm 44 as to force finger 47 into damaging contact with the gage opening 34 when the set ring 31 is removed, as will be clear.

In use, the gage of Figs. 7 and 8 may very readily accommodate a ring, such as the seat ring 31, by simply depressing the handle end 50 of arm 44 so as to raise the finger 47. When the ring 31 is seated on element 35 at points 40—41—42, the opening 34 will be properly spaced with respect to the surface to be gaged, and the handle 50 may be released to permit a resilient clamping. It will be clear that if the surface 30 is as purely spherical as it is intended to be, then it will be possible to rotate the ring 31 with respect to the gage element 35 not only about the axis of the ring 31 but into any position in which all three points 40—41—42 are in contact with the surface 30 and, of course, in all these positions there should be no deviation of pressure indicated on the dial of the pressure gage, which may be the pressure gage 19. With proper adjustment of the needle valve 18, the gage 19 may read zero for a correct spherical radius of the surface 30 and any deviations from this radius, as in the case of an ellipsoidal or partially ellipsoidal surface, may then be direct reading on the gage 19.

In Fig. 9, I show another type of gage element 52 adaptable to the checking of another concave spherical surface 53, which may be the seat of a socket member 54 to be assembled later into a ball-and-socket joint. The gage element 52 is shown to comprise an air-supply pipe or duct 55 communicating with a gage opening 56, which may be on the axis of the element 52. If the element 52 is cylindrical as shown, then the entire lower circumferential rim thereof may be used as the supporting means for properly spacing the opening 56 from the surface 53 to be gaged. The opening 56 is preferably relatively closely spaced from the surface 53 and is shown formed in a projection 57 insertably carried by the lower end of the gage element 52. An exhaust passage 58 may be drilled in the gage element 52 and is preferably of a cross-sectional area greater than the maximum anticipated constriction to be developed between the gage opening 56 and the surface 53. It will be clear that the gage element 53 may be swung into a variety of positions, as indicated by the dotted outline 59, so that the important part of the spherical joint surface 53 may be tested for sphericity, while departures from a true spherical surface may again be noted on a suitable gage, such as the Bourdon gage 19.

In Fig. 10, I show still another form of the invention for particular application to the testing of convex surfaces of generally circular section. In the form shown, the surface 60 to be tested is on the inside of a ring and is of a section radius R, all about an axis 69. As in the previously described forms of the invention, a gage element 61 may be employed with supporting members or feet 62—63 to space a gage opening 64 closely with respect to the surface 60 to be gaged. The opening 64 is shown formed in a projecting plug 65 inserted into the end of gage element 61 and in communication with an air-supply line, such as the pipe 66. For convenience in handling, the pipe 66 is preferably flexible, and handle 67 may be employed for manipulating the gage element 61. If the axis 68 of the gage opening 64 is maintained at a given angle with respect to the axis 69 of the ring 60 while the ring 60 is rotated, it will be clear that observed pressure fluctuations, as indicated on the Bourdon gage 19, may detect departures of form. Contour checks may be made by manipulation of the handle 67 so as to change angularity between axes 68—69.

While I have described my invention in detail for the preferred forms shown, it will be understood that modifications may be made within the scope of the invention as defined in the appended claims.

I claim:

1. In a gaging device of the character indicated, a gage member having an internal air-supply passage with a gage opening on one side thereof, said opening having a blast axis directed away from said member, support means including two essentially point-support areas angularly spaced about the blast axis of said gage opening for abutting a curved surface to be gaged and for positioning said opening in spaced relation with said surface, said areas being axially behind the discharge end of said opening in the sense of said blast axis, whereby said opening may project beyond the radial plane including said supporting means and whereby a first axis of stability for orientation of said opening may be defined, further support means including two essentially point-support areas straddling a plane including said first-mentioned point-support areas, pneumatic-supply means for said passage, and pressure-responsive measuring means in communication with said passage.

2. In a gaging device of the character indicated, a gage member having an internal air-supply passage in communication with a gage opening on one side of said member and having a blast axis directed away from said member, supporting means on said member including two essentially point-support areas angularly spaced about said blast axis for abutting a concave curved surface to be gaged, said areas being axially behind the discharge end of said opening in the sense of said blast axis, whereby said opening may project toward and be spaced from the surface to be measured, resilient means carried with said member and including a part projecting into contact with the piece having the curved surface to be measured and positioned to urge said supporting means and said piece together, said latter projecting part including work-contact areas straddling a plane passing through both said point-support areas, pneumatic-supply means for said passage, and pressure-responsive measuring means in communication with said passage.

3. In a gaging device for checking race contour in an antifriction bearing ring, a source of fluid pressure, a gage member having an internal passage fed from said source and opening on a blast axis at a gaging point on said member, supporting means including two essentially point-support areas angularly spaced about said blast axis on generally opposite sides of the opening at said point, said opening projecting beyond a plane including said supporting means, whereby said supporting means may pilot said opening in proper spaced relation with a bearing raceway and with minimum ambiguous undulation due to surface irregularities, resilient means carried by said member and engaging another part of said bearing ring, said resilient means urging said bearing ring and said member together at said gage point and including work-contact areas straddling a plane passing through both said point-support areas, and a pressure-responsive pressure indicator connected to said passage.

4. A device according to claim 3, in which said member includes a base and a gage insert to fit said base, said gage insert including said supporting means and having the gage opening.

5. A device according to claim 3, in which said resilient means includes two feet to engage the raceway of said bearing ring simultaneously at points substantially symmetrically spaced circumferentially with respect to said blast axis and in the central radial plane of the raceway, whereby said opening may be constantly aligned with respect to the surface to be gaged.

6. In a gaging device of the character indicated, a gage member having an internal air-supply passage with an opening at one side of said member, a first essentially point-support area and a second essentially point-support area on said member and on opposite sides of said opening for minimum-area engagement with a generally arcuate surface of revolution about a central axis, each of said supporting means being substantially in a plane including the axis of said opening, two further essentially point-support areas on said member and on opposite sides of said opening and in a plane substantially normal to the plane of support of said first and second support areas, said planes being taken substantially through the axis of said gage opening, pneumatic-supply means for said passage, and pressure-responsive measuring means in communication with said passage.

7. A gaging device according to claim 6, in which said two further areas are resiliently suspended on said member.

8. In a pneumatic gage of the character indicated for gaging the form and contour of a curved surface having curved intercepts in two mutually perpendicular planes, a gage member including a head with a single circular outwardly directed nozzle, pressure-fluid supply means connected to said nozzle, pressure measuring means in pressure-responsive communication with said nozzle, support means carried by said member for properly orienting said nozzle to direct the nozzle blast against the surface to be gaged, said support means comprising footing means on said head and including four essentially point-support areas for locating engagement with an article having such a curved surface to be gaged, at least two of said essentially point-support areas being disposed in proximity to said nozzle and axially behind the plane of discharge of said nozzle, and at least one of said essentially point-support areas being resiliently loaded relatively to said two areas, said two areas being spaced relatively to said one area generally along the blast axis of said nozzle, whereby at least three of said areas may cooperate with the article being gaged to provide two-axis stability about a normal to the tangent of the surface being gaged, and at least two of said areas may cooperate with such article to provide a third axis of stability.

9. In a pneumatic gage of the character indicated for gaging the form and contour of a curved surface having curved intercepts in two mutually perpendicular planes, a gage member including a head with a single circular outwardly directed nozzle opening, fluid-pressure supply means for said nozzle opening, pressure-measuring means responsive to pressure at said nozzle, support means carried by said member for properly orienting said nozzle to direct the nozzle blast at the surface to be gaged, said support means comprising four essentially point-support areas for engagement with an article having such a curved surface to be gaged, said four areas being located at the corners of a tetrahedron, the effective nozzle-blast axis being directed through substantially the central part of the geometrical solid defined by said four point-support areas, whereby three-axis stability may be assured for accurate and reliable orientation of said nozzle with respect to the surface being gaged.

10. In a pneumatic gage of the character indicated for gaging the form and contour of a curved surface having curved intercepts in two mutually perpendicular planes, a gage member including a head with a single circular outwardly directed nozzle opening, fluid-pressure supply means for said nozzle opening, pressure-responsive measuring means responsive to pressure at said nozzle, support means carried by said member for properly orienting said nozzle to direct the nozzle blast at the surface to be gaged, said support means comprising four essentially point-support areas for engagement with an article having such a curved surface to be gaged, two of said four areas being angularly spaced about the nozzle axis and behind the effective exit plane of the nozzle, and one of said areas being spaced from said two areas along the axis of said nozzle, a perpendicular from the line joining any adjacent two of said point-support areas and perpendicular to the line axis passing through the other adjacent two of said areas intersecting said line axis between said other adjacent two point-support areas, whereby three-axis stability is assured for the orientation of said nozzle.

HORACE BISHOP VAN DORN.

References Cited in the file of this patent

UNITED STATES PATENTS

| Number | Name | Date |
|---|---|---|
| 1,308,324 | Bellard | July 1, 1919 |
| 1,462,130 | Beard | July 17, 1923 |
| 1,845,359 | Stein | Feb. 16, 1932 |
| 2,306,469 | Rupley | Dec. 29, 1942 |
| 2,370,219 | Aller | Feb. 27, 1945 |
| 2,479,606 | Douglass | Aug. 23, 1949 |
| 2,501,965 | Rupley | Mar. 28, 1950 |

FOREIGN PATENTS

| Number | Country | Date |
|---|---|---|
| 875,738 | France | Oct. 1, 1942 |